(12) United States Patent
Thomas et al.

(10) Patent No.: US 6,972,271 B2
(45) Date of Patent: *Dec. 6, 2005

(54) SUPPORTED CATALYST SYSTEMS

(75) Inventors: Raymond H. P. Thomas, Pendleton, NY (US); Roy Robinson, Cheektowaga, NY (US); David Nalewajek, West Seneca, NY (US); Kane D. Cook, Eggertsville, NY (US)

(73) Assignee: Honeywell International Inc., Morristown, NJ (US)

( * ) Notice: Subject to any disclaimer, the term of this patent is extended or adjusted under 35 U.S.C. 154(b) by 58 days.

This patent is subject to a terminal disclaimer.

(21) Appl. No.: 10/965,576

(22) Filed: Oct. 14, 2004

(65) Prior Publication Data

US 2005/0107246 A1    May 19, 2005

Related U.S. Application Data

(63) Continuation of application No. 09/997,024, filed on Nov. 11, 2001, which is a continuation-in-part of application No. 09/617,893, filed on Jul. 17, 2000, now abandoned.

(51) Int. Cl.[7] .......................... B01J 31/00; B01J 37/00; C08F 4/02; C08F 4/60

(52) U.S. Cl. ..................... 502/152; 502/103; 502/104; 502/107; 502/108; 502/117

(58) Field of Search .................. 502/103, 104, 502/107, 108, 117, 152

(56) References Cited

U.S. PATENT DOCUMENTS

| | | | |
|---|---|---|---|
| 4,871,705 A | 10/1989 | Hoel | 502/117 |
| 4,916,108 A | 4/1990 | McLaughlin et al. | 502/337 |
| 5,153,157 A | 10/1992 | Hlatky et al. | 502/117 |
| 5,432,242 A | 7/1995 | Baron | 526/68 |
| 5,625,015 A | 4/1997 | Brinen et al. | 526/160 |
| 5,665,665 A | 9/1997 | Brinen et al. | 502/9 |
| 5,721,184 A | 2/1998 | Brinen et al. | 502/104 |
| 5,744,556 A | 4/1998 | Keller et al. | 526/135 |
| 5,786,291 A | 7/1998 | Speca et al. | 502/104 |
| 5,885,924 A | 3/1999 | Ward | 502/402 |

*Primary Examiner*—J. A. Lorengo
*Assistant Examiner*—J. Pasterczyk
(74) *Attorney, Agent, or Firm*—Deborah M. Chess

(57) ABSTRACT

Disclosed are methods of producing supported organic catalyst systems which find particular use in polymerization reactions. The methods comprise generally, the steps of (a) providing an organic catalyst solution comprising an organic catalyst dissolved in a solvent; (b) contacting the organic catalyst solution with a solid support material; and (c) removing the solvent from the support material by using one or more supercritical-like solvents.

37 Claims, No Drawings

SUPPORTED CATALYST SYSTEMS

CROSS-REFERENCE TO RELATED APPLICATION

This application is a continuation of application Ser. No. 09/997,024 filed Nov. 11, 2001, now allowed, which is a continuation-in-part of application Ser. No. 09/617,893 filed Jul. 17, 2000 (now abandoned).

FIELD OF INVENTION

The present invention relates generally to the preparation of supported catalyst systems. More specifically, the invention relates to methods for producing supported organic catalyst systems, especially metallocene catalyst systems, and the supported catalyst systems made therefrom.

BACKGROUND OF THE INVENTION

Supported organic catalyst systems, particularly metallocene catalyst systems, are of interest for use in polymerization reactions. These catalyst systems typically contain one or more metallocene compounds on a porous support media, such as silica. Supporting the metallocene compounds in this manner improves the handling characteristics of the polymer product and gives better control of reaction rates.

Typically, the supported systems have heretofore been formed by dissolving the catalyst compounds in solvent and attempting to permeate the pores of the support with catalyst solution to form a uniform film of catalyst on the support. For example, U.S. Pat. Nos. 5,665,665 and 5,721,184 disclose the use of toluene to dissolve and transfer metallocene catalyst to the surface of a support material.

The present inventors have come to appreciate that such prior processes are disadvantageous for several reasons. One such disadvantage is that the prior art methods result in relatively uneven distribution of the catalyst on the support. It is believed that this uneven distribution results from non-uniform evaporation of the solvent, which produces concentration gradients and creates uneven layers on the support. This uneven deposition can lead to fouling of the reactor in which the catalyst is used. In addition, the present inventors have come to realize that the use of solvents having relatively high surface tension inhibits penetration of the solution into the fine pores on a support. We have also come to appreciate that the solvents used in the prior art processes require excessive energy and time to remove, and that many solvents used in the prior art processes are disadvantageously flammable.

Recognizing these and other drawbacks of the prior art, the present inventors have perceived a need for a new, efficient and more desirable method for producing a wide range of supported organic catalyst systems. These and other objects are achieved by the present invention as described below.

DESCRIPTION OF THE INVENTION AND PREFERRED EMBODIMENTS

The present invention is directed to methods for producing supported organic catalyst systems and the catalyst systems produced therefrom. As used herein, the term "organic catalyst" refers to a compound which exhibits catalytic properties and which is comprised of at least about 20% by weight of aliphatic or aromatic carbon chains or rings (including the non-carbon substituents thereof). Examples of particularly preferred organic catalysts include metallocene catalyst compounds.

One important aspect of the present invention is the discovery by applicants that supercritical-like solvents and certain low surface tension liquid solvents can be used to great advantage to dissolve and deposit organic catalysts on a wide variety of support materials to produce supported catalyst systems. As used herein, the term "supercritical-like" refers to a solvent in its supercritical state and also refers to any subcritical liquid solvent having a boiling point below about 16° C. at atmospheric pressure. The present inventors believe that such liquid solvents act in certain respects like solvents in their supercritical state for many embodiments of the present invention. As used herein, the term "low surface tension" refers generally to any liquid solvent having a surface tension of less than about 28 dynes per centimeter, and preferably about 22 dynes per centimeter or less.

According to one important aspect of certain embodiments of the invention, the catalyst compound is deposited on the catalyst support using a supercritical-like solvent. This aspect of the present invention can be used to great advantage to insure maximum and uniform distribution of the catalyst compound, and particularly metallocene compounds, on support materials.

Although applicants do not intend to be bound by or to any particular theory of operation, it is believed that supercritical-like solvents possess a number of properties that produce the desirable results of the present invention. For example, applicants have discovered that many metallocene catalysts are soluble, and often highly soluble, in supercritical-like solvents. This relatively high solubility allows a greater amount of catalyst to be introduced to the support to achieve a more even deposition of catalyst on the support. Additionally, it is believed that many supercritical-like solvents have relatively low surface tension properties, which allows greater penetration of support pores by catalyst solutions. Furthermore, supercritical-like solvents generally exhibit high-volatility, which facilitates removal of solvents from the catalyst/support systems and which in turn is believed to contribute to a more even deposition of catalyst on the support than is achieved with conventional high boiling liquids.

According to another important aspect of certain embodiments of the invention, applicants have discovered that certain low surface tension liquid solvents can be used to deposit organic catalysts onto support materials to overcome disadvantages associated with conventional methods of producing catalysts. According to certain embodiments, for example, applicants have discovered that many low surface tension liquid hydrofluorocarbons are useful as solvents for a wide range of organic catalysts. Such solvents tend exhibit beneficial solvating characteristics with regard to organic catalysts and, in addition, tend to be nonflammable.

According to preferred embodiments of the present invention, the methods of producing a supported organic, and preferably metallocene, catalyst system comprise the steps of: (a) providing an organic catalyst compound dissolved in a supercritical-like solvent; (b) contacting a support material with said organic catalyst solution; and (c) removing substantially all of the supercritical-like solvent from the catalyst support.

According to another embodiment of the present invention, the methods comprise the steps of: (a) providing an organic catalyst compound dissolved in a solvent which comprises or consists essentially of a non-supercritical-like hydrofluorocarbon solvent; (b) contacting a support material with said organic catalyst solution; and (c) removing substantially all of the hydrofluorocarbon solvent from the catalyst support.

According to yet another embodiment of the present invention, the methods comprise the steps of: (a) providing an organic catalyst compound, preferably a metallocene compound, dissolved in a first solvent; (b) contacting a support material with said catalyst solution; and (c) removing substantially all of said first solvent from the catalyst support, said removing step including evaporating a supercritical-like solvent from the catalyst support. According to one version of this method, the first solvent of step (a) comprises a supercritical-like solvent and the removing step comprises evaporating said supercritical-like solvent from the catalyst support. In another version of this method, the removing step comprises contacting the catalyst support with a second solvent comprising a supercritical-like solvent. In methods utilizing the second contacting step, the first solvent may or may not include a supercritical-like solvent.

It is contemplated that any compound which satisfies the above definition of "organic catalyst" may be used as an organic catalyst in the present invention.

The term "metallocene catalyst", as used herein, refers generally to a catalyst comprising at least one metallocene compound which exhibits catalytic properties. The metallocene catalysts of the present invention may optionally contain additional catalytic metallocene compounds, co-catalysts, activator compounds and/or additives, such as those described in U.S. Pat. Nos. 5,665,665, 5,786,291 and 5,721,184, each of which is incorporated herein by reference. Accordingly, any single catalytic metallocene compound or combination of a single catalytic metallocene compound with other metallocene compounds, co-catalysts, activator compounds and/or additives will be a "metallocene catalyst" for purposes of the present invention.

The metallocene compound or compounds used in the preferred aspects of the present invention can be any metallocene known to possess catalytic activity. For example, U.S. Pat. Nos. 5,665,665, 5,786,291 and 5,721,184 describe a wide range of metallocene compounds which are used as catalysts in various applications and are suitable for use in the present invention. Specifically, as disclosed at column 3, lines 10–12 and 57–58 of U.S. Pat. No. 5,721,184, the metallocene may include a transition metal atom of Group 4, 5, or 6, preferably zirconium, titanium, and halfnium. Other suitable metallocene compounds include zirconium metallocene compounds such as dichloro(bis(n-butylcyclopentadienyl) zirconium (IV) and dichlorobis(cyclopentadienyl) zirconium (IV), and halfnium compounds such as dimethylbis(t-butylcyclopentadienyl) hafnium (IV).

Co-catalysts are often used in conjunction with metallocene compounds such co-catalysts generally serving to activate the metallocene compound. Examples of co-catalysts suitable for use in the present invention are described in U.S. Pat. Nos. 5,625,015, 5,665,665 and 5.153,157, which are incorporated herein by reference, and include aryl boron compounds, such as tri-(n-butyl) ammonium tetra bis(pentafluorophenyl) boron and tris (pentafluorophenyl) borane, as well as alumoxane, methylalumoxane and their derivatives. Any of these co-catalysts and any other metallocene co-catalysts known in the art can be used in the present invention.

As mentioned above, certain preferred embodiments of the present invention incorporate the use of supercritical-like solvents and certain low surface tension liquid solvents.

A wide range of solvents in their supercritical state, and a wide range of solvents in their liquid state and having a boiling point below about 16° C., may be used as supercritical-like solvents in the present invention. Examples of solvents which can be utilized in the present invention in their supercritical state, at temperatures and pressures commonly used industrially, include: chlorofluorocarbons such as trifluorochloromethane, hydrofluorocarons such as difluoromethane, isomers of tetrafluoroethane, pentafluoroethane, isomers of trifluoroethane, as well as, isomers of hydrofluoropropanes, hydrofluorobutanes, hydrofluoropentanes and hydrofluorohexanes, such as those listed in Table 1, hydrochlorofluorocarbons such as difluorochloromethane, and isomers of tetrafluorochloroethane, and other compounds such as ethers, aliphatic alcohols, water, carbon dioxide, ammonia, sulfur dioxide and nitrous oxide. Mixtures of the aforementioned solvents may also be used in their supercritical state as supercritical-like solvents of the present invention. The critical temperatures and pressures for some selected fluids that are adaptable for use as supercritical fluids according to the present invention are listed in Table 2, below.

TABLE 1

Examples of Hydrofluorocarbons for use in the present invention.

| Compound | Symbol | Boiling Point, ° C. |
|---|---|---|
| CF3CF2CH2CH2F | HFC-356mcf | 44 |
| CF3CHFCHFCF2CF3 | HFC-43-10mee | 53.4 |
| C2F5C2H4C2F5 | HFC-55-10mffcm | 66 |
| CHF2CHFCHFCF2H | HFC-356peep | 68 |
| CF2HCHFCF2CH2F | HFC-356pecq | 65 (est.) |
| C2F5CH2CH2F | HFC-356mcfq | 45 |
| CH3CF2CH2CF3 | HFC-365mfc | 40.2 |
| CHF2CHFCHF2 | HFC-245ea | 40 |
| CF2HCF2CH2F | HFC-245ca | 25 |
| CF3CHFCH2F | HFC-245eb | — |
| CF3CH2CF2H | HFC-245fa | 15.3 |
| CF3CF2CH3 | HFC-245cb | −18.3 |
| CF3CHFCF2H | HFC-236ea | 6.5 |
| CF3CH2CF3 | HFC-236fa | −1.1 |
| CF3CF2CF2H | HFC-227ca | −16.3 |
| CH2FCF2CF3 | HFC-236cb | −1.44 |
| CHF2CF2CH3 | HFC-254cb | −0.78 |

TABLE 2

Critical Temperatures and Pressures For Selected Fluids

| Fluid | Critical Temperature (° C.) | Critical Pressure (psia) |
|---|---|---|
| Carbon dioxide | 31.1 | 1070 |
| Ammonia | 132.3 | 1645 |
| Water | 374.4 | 3205 |
| Nitrous oxide | 36.5 | 1080 |
| 1,1,1,3,3-pentafluoropropane (HFC-245fa) | 154 | 643 |
| pentafluoroethane (HFC-125) | 66.2 | 526 |
| 1,1,1,2-tetrafluoroethane (HFC-134a) | 101.1 | 589 |
| Chlorodifluoromethane (HCFC-22) | 96.2 | 724 |
| Difluoromethane (HFC-32) | 78.2 | 838 |
| Monofluoromethane | 44.1 | 856 |
| Dichlorodifluoromethane | 111.7 | 600 |
| Trichlorofluoromethane | 196.6 | 640 |
| Chlorotrifluoromethane | 29.2 | 569 |
| Trifluoromethane ("HFC-23") | 25.9 | 701 |

Examples of solvents which can be used in their liquid state as supercritical-like solvents in the present invention include: methane, ethane, ethylene, propylene, chlorofluorocarbons such as trifluorochloromethane, hydrofluorocarbons such as difluoromethane, isomers of tetrafluoroethane, pentafluoroethane, isomers of trifluoroethane, isomers of pentafluoropropane, hydrochlorofluorocarbons such as difluorochloromethane, and isomers of tetrafluorochloroethane, and other compounds such as carbon dioxide, and ammonia.

In preferred embodiments, the supercritical-like solvent is a solvent in its supercritical state.

Examples of low surface tension liquid solvents suitable for use in the present invention include hydrofluorocarbons such as isomers of hydrofluoropropanes, hydrofluorobutanes, hydrofluoropentanes and hydrofluorohexanes. Certain preferred low surface tension liquid solvents include HFC-356mcf, HFC-43-10mee, HFC-55-10mffcm, HFC-356peep, HFC-356pecq, HFC-356mcfq, HFC-365mfc, HFC-245ea, HFC-245ca, and mixtures of two or more thereof. Such solvents preferably contain at least 65 weight percent fluorine which reduces their flammability and makes them safer to use.

The selection of a solvent for use in preferred embodiments of the present invention will generally depend on the organic catalyst used. With respect to the metallocenes, for example, different metallocene catalysts dissolve to varying degrees in different supercritical-like and low surface tension liquid solvents. Thus, for any metallocene catalyst used, it is desirable to utilize a solvent in which the metallocene catalyst will dissolve sufficiently to satisfy the objects of the present invention, such as providing a relatively high rate of uniform deposition of catalyst compound on the catalyst support. According to certain preferred embodiments, the organic catalyst compound, and preferably the metallocene compound, has a solubility in the supercritical-like or low surface tension liquid solvent of at least about 0.005 wt %, more preferably at least about 0.35 wt %, and even more preferably at least about 2.5 wt %, all as measured under the conditions under which the supercritical-like and/or low surface tension liquid solvent initially contacts the catalyst support.

The metallocene catalyst can be dissolved in the solvent via any method known in the art. For example, in embodiments of the present invention where the solvent is in its supercritical state, the metallocene catalyst and solvent can be added together under subcritical conditions and then subjected to conditions sufficient to bring the solvent into its supercritical state. Alternatively, the metallocene catalyst can be added to the solvent under supercritical conditions.

In view of the teaching contained herein, those of skill in the art will be readily able to determine the temperature and pressure under which organic catalysts are to be added to supercritical-like and/or non-supercritical-like solvents according to the present invention. The temperature to be used for a particular application will depend, in part, on both the solvent used to dissolve the catalyst and upon the pressure. In general, organic catalysts are added to solvents according to the present invention at a temperature of from about −10° C. to about 200° C. Preferably, the temperature is from about 30° C. to about 100° C. In certain preferred embodiments, the pressure at which the solvent and catalyst are added is generally from about 25 psia to about 5,000 psia, and more preferably from about 100 to 3,500 psia.

To identify metallocene/solvent and co-catalyst/solvent pairs which may be used in preferred embodiments of the present invention, the present inventors conducted initial solubility studies at about room temperature. The solubility studies were conducted by dissolving small amounts of metallocene or co-catalyst in liquid-state solvents at about 40° C. to determine whether the selected compound had any solubility in the solvent at that temperature. Table 3, below, indicates several solvents, including 1,1,1 trifluoroethane ("HFC-143a") and chlorotetrafluoroethane ("HCFC-124"), in which three metallocene compounds, dichloro(bis(n-butylcyclopentadienyl) zirconium (IV), dichlorobis(cyclopentadienyl) zirconium (IV) and ferrocene and a co-catalyst tris(pentafluorophenyl) borane were found to be soluble. Because the solubility of organic compounds in a solvent at low temperatures generally increases as the solvent is made supercritical, it is believed that the compound/solvent pairs in Table 3 are useful as supercritical solvents of the present invention.

TABLE 3

Compounds Soluble in Room Temperature Solvents

| Compound | Solvents in which Soluble at Room Temp. |
|---|---|
| Dichlorobis(cyclopentadienyl) zirconium (IV) | HFC-245fa |
|  | HCFC-22 |
| Ferrocene | HCFC-22 |
|  | HFC-32 |
|  | HFC-125 |
|  | HFC-245fa |
|  | HFC-134a |
| Dichloro(bis(n-butylcyclopentadienyl) zirconium (IV) | HCFC-22 |
|  | HFC-32 |
|  | HFC-125 |
|  | HFC-245fa |
| Tris(pentafluorophenyl) borane | HCFC-124 |
|  | HFC-32 |
|  | HFC-125 |
|  | HFC-143a |
|  | HFC-134a |

Moreover, the present inventors have further identified metallocene/supercritical solvent and co-catalyst/supercritical solvent pairs of varying solubilities which might be used in the method of the present invention. For example, dimethylbis(t-butylcyclopentadienyl) hafnium (IV) was found to have a solubility of at least about 2.8 wt. % in 1,1,1,2-tetrafluoroethane ("HFC-134a") at 100° C. and 2000 psia and dichloro(bis(n-butylcyclopentadienyl) zirconium (IV) was found to have solubility of at least about 0.35 wt % in pentafluoroethane ("HFC-125") at 76° C. and 2000 psia and about 0.25 wt % in carbon dioxide at 55° C. and 3500 psia. On the other hand, rac-ethylenebis(indenyl) zirconium (IV) dichloride was found to be substantially insoluble in HFC-125 at 76° C. and 2000 psia. The co-catalyst tris(pentafluorophenyl) borane was found to be highly soluble in both supercritical HFC-134a and carbon dioxide.

In certain embodiments of the present invention, the providing step (a) comprises dissolving an organic catalyst in a first solvent comprising a liquid solvent. In such embodiments, it is preferred that the providing step (a) be followed by a removing step which comprises contacting the catalyst support with a second solvent comprising a supercritical-like solvent. In such embodiments, the first solvent may be any liquid solvent, including a mixture of a non-supercritical-like solvent and a supercritical-like solvent. Preferably, the first solvent should be chosen such that the organic catalyst to be deposited is sufficiently soluble in the solvent. Examples of liquid solvents suitable for use as or in a first solvent include those described above as suitable for use in other embodiments of the present invention. In addition, U.S. Pat. Nos. 5,665,665 and 5,721,184 describe a number of liquid solvents including toluene, xylene, hexane, pentane and the like, which can be used to dissolve a wide variety of metallocene catalysts and can be used as or in a first solvent according to the present invention. In addition, a wide range of other liquid solvents suitable for use in a first solvent are known in the art and are available commercially.

In light of the disclosure contained herein, those of ordinary skill in the art can determine catalyst/solvent pairs for use in the present invention without undue experimentation. In cases where the solubility of the organic catalyst has a low solubility in the supercritical-like solvent or low surface tension liquid solvent, suitable entrainers may be used to enhance solubility. Entrainers have greater solubility for the catalyst than the solvent and can be added in small amounts to the solvent. Suitable entrainers can include substances such as heptane, toluene, pentane and other hydrocarbons. The concentration of the entrainers is sufficient to increase the solubility of the catalyst but not enough to cause a problem in removal from the support surface. In preferred embodiments, the entrainer concentration is from about 0.1 weight percent to about 20 weight percent, based on the total weight of solvent and entrainer.

According to preferred embodiments, the step of contacting a porous support material with the organic catalyst solution comprises coating substantially the entire surface area of the support material with the catalyst solution such that the catalyst solution penetrates substantially all of the pores of the support and such that removal of the solvent results in substantially uniform deposition of catalyst in the pores and on the surface of the support material. Any known method for coating the surface of the support can be used in the present invention including, for example, immersion of the support in the catalyst solution, adding the catalyst solution dropwise to the support, spraying the support, or the like.

In embodiments of the present invention wherein the organic catalyst compound is dissolved in a supercritical-like solvent, the preferred coating method is immersion.

In other embodiments of the invention, it is desirable to minimize the amount of catalyst solution solvent used to contact the support. This is especially true when a relatively non-volatile solvent like toluene is used. In general, the lower the amount of solvent used to contact the support, the more rapidly and easily the solvent can be removed from the support to form the supported catalyst system. Accordingly, a preferred method for contacting the catalyst support comprises adding the solution dropwise to the solid support until the support is at an "incipient wetness" state. As used herein, the term "incipient wetness" refers generally to a free flowing porous powder becoming wetted to the point at which a further small addition of liquid brings about a marked decrease in its ability to flow, [see W. B. Innes, Analytical Chemistry, Vol. 28, No. 3, Mar. 1956, page 332, which is incorporated herein by reference]. In this manner, the metallocene catalyst can be introduced to the solid support using a minimal amount of solvent which, in turn, can be more easily removed to form a supported catalyst system.

The contacting step also preferably comprises maintaining the support and solution at a temperature such that the solvent is in a supercritical or liquid state, with the supercritical state being preferred. In the case where the solvent is to be used in its supercritical state, this requires that the temperature and pressure be maintained about at or above the critical temperature of the solvent. In the case where the solvent used is not in its supercritical state, it is preferred that the temperature and pressure of the contacting step be maintained such that the solvent is in a liquid state. Accordingly, the step of contacting the porous support with the catalyst solution is preferably carried out in a temperature-controlled high-pressure vessel, such as a high pressure tube, an autoclave or similar chamber.

For contacting steps which comprise coating, the time required to coat the support depends on a number of factors including the support pore size and surface area. However, because supercritical-like solvents and low surface tension solvents of the present invention generally have lower surface tension than prior solvents, such as toluene, it is believed that they will penetrate the pores of the support in a relatively shorter time than solvents such as toluene.

The porous support material used in the present invention can be any conventional support material known in the art. The support can be a powder or a single piece of solid material that is porous. Suitable support materials include, for example, inorganic solvents such as alumina, magnesia, titania, zirconia, silica and silica compounds that have been reacted with halogenated organic compounds, as described in U.S. Pat. No. 5,885,924, incorporated herein by reference. In addition, talc, polymeric materials and other organic support, such as those described in U.S. Pat. No. 5,665,665, can be used as support material in the present invention.

According to certain embodiments, the step of removing the solvent from the support material preferably comprises evaporating the supercritical-like or low surface tension solvent from the catalyst support. Any of a wide range of methods for evaporating solvents may be used according to the present invention. According to preferred embodiments, the evaporating step comprises changing the pressure and/or temperature to which the support material is exposed such that the solvent is converted to the gaseous state.

As those of skill in the art will recognize, solvents in their supercritical state can be readily converted to the gaseous state by changing the pressure, the temperature or both pressure and temperature such that the solvent is no longer under supercritical conditions. Furthermore, liquid supercritical-like solvents (solvents whose atmospheric boiling point is about 16° C. or lower) of the present invention can generally be converted to gasses by lowering the pressure or by increasing the temperature. Once the solvents are converted to gasses, they can be readily removed from the supported catalyst system.

Moreover, the change in conditions surrounding the catalyst solution results in deposition of the catalyst out of solution and onto the porous support. The solubility of the catalysts and co-catalysts in various solvents can be decreased dramatically as the surrounding conditions are changed. Thus, by varying conditions, the catalyst can be uniformly deposited on the support. Thereafter, the supercritical-like or low surface tension solvent is converted to the gaseous state by evaporation. This process also facilitates removal of solvent from the catalyst support. Table 4 illustrates the variable solubility of a co-catalyst, tris(pentafluorophenyl) borane in HFC-125 under various pressures.

TABLE 4

Solubility at Various Pressures of tris(pentafluorophenyl) borane in HFC-125 at 76° C.

| Pressure (atm.) | Solubility (wt %) |
|---|---|
| 2000 | 6.85 |
| 750 | 5.67 |

TABLE 4-continued

Solubility at Various Pressures of
tris(pentafluorophenyl) borane in HFC-125 at 76° C.

| Pressure (atm.) | Solubility (wt %) |
|---|---|
| 625 | 4.50 |
| 500 | 0.77 |

In certain embodiments of the present invention wherein the organic catalyst is dissolved in a first solvent which does not comprise supercritical-like solvent or a low surface tension liquid solvent of the present invention, the removing step comprises contacting the catalyst support with a second solvent comprising a supercritical-like solvent and evaporating said supercritical-like solvent. In such embodiments, the supercritical-like solvent takes the first solvent into solution very readily and thereby removes the first solvent from the catalyst and its support. This can be done under conditions of temperature and pressure such that the catalyst and co-catalyst are practically insoluble in the supercritical-like solvent while the supercritical-like solvent selectively retains its solubility for the first solvent. This is possible because the solubility of a catalyst or co-catalyst in super-critical-like solvent can vary dramatically with temperature and pressure.

Any of the supercritical-like solvents described hereinabove can be used to remove the first solvents used in the present invention. To maximize the amount of first solvent removed while minimizing the removal of catalyst from the support, the supercritical-like solvent selected is preferably one in which the first solvent is relatively soluble and the organic catalyst is relatively insoluble. For example, as described above, rac-ethylenebis(indenyl) ethylenebis(indenyl) zirconium (IV) dichloride is relatively insoluble in HFC-125. Accordingly, HFC-125 can be used in the present invention to effectively remove a first solvent soluble in HFC-125, such as toluene or heptane, from a rac-ethylenebis(indenyl) zirconium (IV) dichloride catalyst support system with minimal removal of the catalyst from the support.

It is also believed that toluene is sufficiently soluble in HFC-134a at room temperature to be used as a first solvent of the present invention. At room temperature, the solubility of many organic catalysts such as metallocenes is very low in HFC-134a, and therefore toluene can be selectively removed by HFC-134a from a support that has both the metallocene and toluene.

Furthermore, the relative solubilities of first solvents in supercritical-like solvents tend to vary at different temperatures and pressures in much the same way that the solubilities of catalysts and co-catalysts in supercritical-like solvents vary at differing conditions (as illustrated above). Accordingly, the conditions under which a supercritical-like solvent is used to remove a first solvent according to present invention can be optimized to afford a relatively high solubility of first solvent in supercritical-like solvent while minimizing the solubility of the organic catalyst. In view of the disclosure contained herein, those of skill in the art will be readily able to optimize the conditions under which the removal step is conducted without undue experimentation.

Once an organic catalyst has been deposited according to the present invention, the removed solvent can be recycled for further use. In this manner, the present invention allows for uniform distribution of an organic catalyst on a porous support without the need for time-consuming solvent-removing drying steps and excess clean-up.

Although applicants do not intend to be bound by or to any particular theory of operation, it is believed that the organic catalyst is generally distributed onto the support material by a combination of adsorption and precipitation. However, the predominant mechanism will depend on the nature of the support and of the catalyst or co-catalyst. It is contemplated that in certain embodiments the catalyst chemically reacts with the support so that the catalyst or co-catalyst will be chemically bound to the support. Any of these mechanisms will provide deposition of catalyst with solvents according to the present invention.

Furthermore, the method of the present invention can be used to deposit any number of organic catalysts or co-catalysts onto a support either simultaneously or sequentially. Both methods, using sequential or simultaneous deposition, are acceptable and practical. When depositing multiple compounds and co-catalysts simultaneously it is highly preferred to use a solvent or combinations of solvents in which all materials are soluble. However, catalysts and co-catalysts can be deposited sequentially, according to the present invention, using the same or different solvents for each catalyst or co-catalyst deposited. For example, after depositing a single metallocene compound onto a support via a supercritical-like solvent according to the present invention, a co-catalyst for use with the metallocene compound can be separately deposited on the support by dissolving it in the same or a different supercritical-like solvent and depositing it on the support according to the present invention. Alternatively, two or more metallocene catalysts, each having a metallocene compound and a co-catalyst, could be deposited sequentially according to the present invention in the same or in different solvents. Likewise, the sequential deposition of several metallocene catalysts and co-catalysts in various sequences may be performed according to the present invention.

In a preferred embodiment, the sequential addition of catalysts and co-catalysts is performed using supercritical-like solvents which are selective solvents for the catalyst or co-catalyst dissolved therein. As used herein, the phrase "selective solvent" refers generally to a solvent in which one organic catalyst or co-catalyst to be deposited on a support is relatively soluble and other catalysts or co-catalysts to be deposited on the support are relatively insoluble. By using selective solvents, the removal of previously deposited catalysts and co-catalysts by the solvents of subsequently deposited materials is minimized or eliminated.

The organic catalyst systems formed by the methods of the present invention find wide utility in the chemical arts. For example, metallocene catalyst systems are especially useful in the polymerization of alkenes such as ethylene, propylene, butene and their substituted derivatives.

EXAMPLES

In order that the invention may be more readily understood, reference is made to the following examples which are intended to be illustrative of the invention, but are not intended to be limiting in scope.

Example 1

This example illustrates the solubility of dimethylbis(t-butylcyclopentadienyl) hafnium (IV) in HFC-134a in its supercritical state at 100° C. and 2000 psia.

1.96 grams of dimethylbis(t-butylcyclopentadienyl) hafnium (IV) were placed into a high pressure vessel having a vessel inlet connected to a source of HFC-134a and a vessel outlet connected to a micro-metering valve across which pressure can be reduced from several thousand psia to one atmosphere. A high pressure pump was placed between the high pressure vessel and the HFC-134a source and the vessel was thermostatted to 100° C. The micro-metering valve was heated to 180° C. HFC-134a was brought into the vessel and the pressure was raised to 2000 psia. The HFC-134a was allowed to pass through the vessel to dissolve the catalyst and through the micro-metering valve into an ice-cooled vessel connected to the micro-metering valve wherein the catalyst was precipitated out of HFC-134a. After the HFC-134a passed through the ice-cooled vessel, its flow rate was measured and it was collected in a liquid nitrogen trap. After sufficient time for 63 grams of HFC-134a to have flowed through the high pressure vessel, the flow of gas was stopped. The weight changes of the high pressure vessel and the ice-cooled vessel were recorded along with the amount of HFC-134a in the liquid nitrogen trap. Approximately 1.83 grams of catalyst was lost from the high pressure vessel. The solubility was approximately 2.8 wt %.

Example 2

This example illustrates the solubility of dichloro(bis(n-butylcyclopentadienyl) zirconium (IV) in carbon dioxide at 55° C. and 3500 psia.

1.0 gram of dichloro(bis(n-butylcyclopentadienyl) zirconium (IV) was placed into a high pressure vessel having a vessel inlet connected to a source of carbon dioxide and a vessel outlet connected to a micro-metering valve across which pressure can be reduced from several thousand psia to one atmosphere. A high pressure pump was placed between the high pressure vessel and the carbon dioxide source and the vessel was thermostatted to 55° C. The micro-metering valve was heated to 180° C. Carbon dioxide was brought into the vessel and the pressure was raised to 3500 psia. The carbon dioxide was allowed to pass through the vessel to dissolve the catalyst and through the micro-metering valve into an ice-cooled vessel connected to the micro-metering valve wherein the catalyst was precipitated out of carbon dioxide. After the carbon dioxide passed through the ice-cooled vessel, its flow rate was measured and it was collected in a liquid nitrogen trap. After sufficient time for 128 grams of carbon dioxide to have flowed through the high pressure vessel, the flow of gas was stopped. The weight changes of the high pressure vessel and the ice-cooled vessel were recorded along with the amount of carbon dioxide in the liquid nitrogen trap. Approximately 0.32 grams of catalyst was lost from the high pressure vessel. The solubility was approximately 0.25 wt %.

Example 3

This example illustrates the solubility of tris(pentafluorophenyl) borane in HFC-134a at 100° C. and 2000 psia.

1.2 grams of tris(pentafluorophenyl) borane were placed into a high pressure vessel having a vessel inlet connected to a source of HFC-134a and a vessel outlet connected to a micro-metering valve across which pressure can be reduced from several thousand psia to one atmosphere. A high pressure pump was placed between the high pressure vessel and the HFC-134a source and the vessel was thermostatted to 100° C. The micro-metering valve was heated to 180° C. HFC-134a was brought into the vessel and the pressure was raised to 2000 psia. The HFC-134a was allowed to pass through the vessel to dissolve the co-catalyst and through the micro-metering valve into an ice-cooled vessel connected to the micro-metering valve wherein the co-catalyst was precipitated out of HFC-134a. After the HFC-134a passed through the ice-cooled vessel, its flow rate was measured and it was collected in a liquid nitrogen trap. After sufficient time for 73 grams of HFC-134a to have flowed through the high pressure vessel, the flow of gas was stopped. The weight changes of the high pressure vessel and the ice-cooled vessel were recorded along with the amount of HFC-134a in the liquid nitrogen trap. All the material in the high pressure vessel was lost and an equal amount of material was collected in the ice-cooled vessel.

Example 4

This example illustrates the solubility dichloro(bis(n-butylcyclopentadienyl) zirconium (IV) of in carbon dioxide at 55° C. and 3500 psia.

1.3 grams of dichloro(bis(n-butylcyclopentadienyl) zirconium (IV) was placed into a high pressure vessel having a vessel inlet connected to a source of carbon dioxide and a vessel outlet connected to a micro-metering valve across which pressure can be reduced from several thousand psia to one atmosphere. A high pressure pump was placed between the high pressure vessel and the carbon dioxide source and the vessel was thermostatted to 55° C. The micro-metering valve was heated to 180° C. Carbon dioxide was brought into the vessel and the pressure was raised to 3500 psia. The carbon dioxide was allowed to pass through the vessel to dissolve the co-catalyst and through the micro-metering valve into an ice-cooled vessel connected to the micro-metering valve wherein the co-catalyst was precipitated out of carbon dioxide. After the carbon dioxide passed through the ice-cooled vessel, its flow rate was measured and it was collected in a liquid nitrogen trap. After sufficient time for 55 grams of carbon dioxide to have flowed through the high pressure vessel, the flow of gas was stopped. The weight changes of the high pressure vessel and the ice-cooled vessel were recorded along with the amount of carbon dioxide in the liquid nitrogen trap. All the material in the high pressure vessel was lost and an equal amount of material was collected in the ice-cooled vessel.

Example 5

This example illustrates the solubility of dichloro(bis(n-butylcyclopentadienyl) zirconium (IV) of in HFC-125 at 76° C. and 2000 psia.

1.3 grams of dichloro(bis(n-butylcyclopentadienyl) zirconium (IV) was placed into a high pressure vessel having a vessel inlet connected to a source of HFC-125 and a vessel outlet connected to a micro-metering valve across which pressure can be reduced from several thousand psia to one atmosphere. A high pressure pump was placed between the high pressure vessel and the HFC-125 source and the vessel was thermostatted to 76° C. The micro-metering valve was heated to 180° C. HFC-125 was brought into the vessel and the pressure was raised to 2000 psia. The HFC-125 was allowed to pass through the vessel to dissolve the co-catalyst and through the micro-metering valve into an ice-cooled vessel connected to the micro-metering valve wherein the co-catalyst was precipitated out of HFC-125. After the HFC-125 passed through the ice-cooled vessel, its flow rate was measured and it was collected in a liquid nitrogen trap. After sufficient time for 55 grams of HFC-125 to have flowed through the high pressure vessel, the flow of gas was stopped. The weight changes of the high pressure vessel and the ice-cooled vessel were recorded along with the amount of HFC-125 in the liquid nitrogen trap. All the material in the high pressure vessel was lost and an equal amount of material was collected in the ice-cooled vessel. The solubility was approximately 0.35 wt %.

Example 6

This example illustrates the room temperature solubility of ferrocene in a number of liquid solvents.

A small amount of ferrocene, the simplest of the metallocenes, was placed in a glass tube and a liquid solvent was added using a vacuum transfer manifold. After the liquid was transfered, the tube and its contents were brought to room temperature. The tube was observed for complete dissolution of the solid. Table 4, below, indicates the weight percent of ferrocene dissolved and the solvents into which the ferrocene completely dissolved.

TABLE 4

Room Temperature Solvation of Ferrocene

| Amount of Ferrocene Completely Dissolved (wt. %) | Solvent |
| --- | --- |
| 0.17 | HFC-22 |
| 0.18 | HFC-32 |
| 0.06 | HFC-125 |
| 0.08 | HFC-134a |

Example 7

This example illustrates the deposition of a catalyst onto a silica support.

A catalyst is placed in a high pressure tube that is connected in series to a second vessel containing a solid silica support. The two vessels are separately thermostatted such that the vessel containing the solid support is at a lower temperature than the high pressure tube. Between the two vessels there is a valve that allows the pressure in the second vessel to be lower than in the tube. The second vessel is connected to a cooled recycle loop that leads to a pump that feeds the high pressure tube. A supply vessel containing virgin solvent is also connected to the pump which feeds the high pressure tube. Solvent is pumped into the high pressure tube and brought up to the required temperature and pressure such that the solvent is in a supercritical state and catalyst is dissolved therein. The catalyst-laden solvent then passes into the second vessel containing the support where the support is immersed in the solvent for a time sufficient to ensure that the solvent substantially penetrates uniformly into the pores of the catalyst support. The temperature is subsequently dropped and the pressure is lowered to precipitate substantially all of the catalyst onto the support. The substantially catalyst-free solvent is then evaporated and recycled to the pump.

Having thus described a few particular embodiments of the invention, various alterations, modifications and improvements will readily occur to those skilled in the art. Such alterations, modifications and improvements as are made obvious by this disclosure are intended to be part of this description though not expressly stated herein, and are intended to be within the spirit and scope of the invention. Accordingly, the foregoing description is by way of example only, and not limiting. The invention is limited only as defined in the following claims and equivalents thereto.

What is claimed is:

1. A method of producing a supported metallocene catalyst system comprising the steps of:
    (a) providing a metallocene catalyst solution comprising an hafnium metallocene catalyst dissolved in a supercritical-like solvent at a temperature of from about −10° C. to about 200° C.;
    (b) contacting a support material with said metallocene catalyst solution; and
    (c) removing substantially all of said supercritical-like solvent from said metallocene catalyst and said support material.

2. The method of claim 1 wherein said hafnium metallocene catalyst comprises halfnium (IV) compounds.

3. The method of claim 2 wherein said hafnium (IV) compound is dimethylbis(t-butylcyclopentadienyl) hafnium (IV).

4. The method of claim 1 wherein said supercritical-like solvent is a solvent in its supercritical state.

5. The method of claim 1 wherein said supercritical-like solvent comprises a liquid solvent in a subcritical state selected from the group consisting of methane, ethane, ethylene, propylene, trifluorochloromethane, difluoromethane, isomers of tetrafluoroethane, pentafluoroethane, isomers of trifluoroethane, isomers of pentafluoropropane, difluorochloromethane, isomers of tetrafluorochloroethane, carbon dioxide, ammonia, and mixtures of two or more thereof.

6. The method of claim 5 wherein said liquid solvent comprises liquid carbon dioxide.

7. The method of claim 1 wherein said providing step (a) comprises dissolving said metallocene catalyst in said supercritical-like solvent at a temperature of from about 30° C. to about 100° C.

8. The method of claim 1 wherein said providing step (a) comprises dissolving said metallocene catalyst in said supercritical-like solvent at a pressure of from about 25 psia to about 5,000 psia.

9. The method of claim 8 wherein said providing step (a) comprises dissolving said metallocene catalyst in said supercritical-like solvent at a pressure of from about 100 psia to about 3,500 psia.

10. The method of claim 1, wherein said metallocene catalyst comprises a co-catalyst.

11. The method of claim 10, wherein said co-catalyst is selected from the group consisting of tri-(n-butyl) ammonium tetrakis (pentafluorophenyl) boron, tris (pentafluorophenyl) borane, an alumoxane, methylalumoxane and mixtures thereof.

12. The method of claim 1 wherein said support material is selected from the group consisting of alumina, silica and silica treated with a halogenated organic compound.

13. The method of claim 12 wherein said support material comprises a plurality of particles.

14. A method of producing a supported metallocene catalyst system comprising the steps of:
    (a) providing a metallocene catalyst solution comprising a transition metal metallocene catalyst dissolved in a supercritical-like solvent at a temperature of from about −10° C. to about 200° C., wherein said transition metal is selected from the group consisting of Group 4, Group 5, and Group 6 transition metals;
    (b) contacting a support material with said metallocene catalyst solution; and
    (c) removing substantially all of said supercritical-like solvent from said metallocene catalyst and said support material.

15. The method of claim 1 wherein said removing step (c) comprises converting said supercritical-like solvent to a gaseous state.

16. The method of claim 15 wherein said supercritical-like solvent is converted to a gaseous state by adjusting the temperature of said solvent.

17. The method of claim 15 wherein said supercritical-like solvent is converted to a gaseous state by adjusting the pressure of said solvent.

18. The method of claim 1 further comprising the steps of:
(d) providing a second metallocene catalyst solution comprising a second metallocene catalyst dissolved in a supercritical-like solvent;
(e) contacting said support material with said second metallocene catalyst solution; and
(f) removing substantially all of said supercritical-like solvent of said second solution from said second metallocene catalyst and said support material.

19. The method of claim 18, wherein said metallocene catalyst solution and said second metallocene catalyst solution are contacted with said support material substantially simultaneously.

20. The method of claim 18, wherein said solvent of said second solution is a selective solvent for said second metallocene catalyst.

21. A method for producing a supported metallocene catalyst system comprising the steps of:
(a) providing a metallocene catalyst solution comprising a metallocene catalyst selected from the group consisting of hafnium compounds and ferrocenes dissolved in a first solvent at a temperature of from about −10° C. to about 200° C.;
(b) contacting a support material with said catalyst solution; and
(c) removing substantially all of said first solvent by contacting said first solvent with a supercritical solvent and evaporating said supercritical solvent.

22. The method of claim 21, wherein said first solvent is a liquid solvent.

23. The method of claim 21 further comprising the steps of:
(d) providing a second metallocene catalyst solution comprising a second metallocene catalyst dissolved in a second solvent at a temperature of from about −10° C. to about 200° C.;
(e) contacting said support material with said second metallocene catalyst solution; and
(f) removing substantially all of said second solvent by contacting said second solvent with a supercritical solvent and evaporating said supercritical solvent.

24. The method of claim 23, wherein said metallocene catalyst solution and said second metallocene catalyst solution are contacted with said support material substantially simultaneously.

25. The method of claim 14, wherein said transition metal is a group 4 metal.

26. A method of producing a supported metallocene catalyst system comprising the steps of:
(a) providing an organic catalyst solution comprising a metallocene catalyst dissolved in a solvent comprising a liquid hydrofluorocarbon solvent;
(b) contacting a support with said metallocene catalyst solution; and
(c) removing substantially all of said liquid hydrofluorocarbon solvent from said metallocene catalyst and said support material.

27. The method of claim 25, wherein said transition metal is titanium.

28. The method of claim 26, wherein said metallocene catalyst comprises a metallocene compound selected from the group consisting of zirconium metallocenes, hafnium metallocenes, and ferrocenes system.

29. The method of claim 28, wherein said zirconium metallocene is selected from the group consisting of dichlorobis(n-butylcyclopentadienyl) zirconium (IV), dichlorobis (cyclopentadienyl) zirconium (IV) and mixtures thereof.

30. The method of claim 29, wherein said hafnium metallocene compound is dimethylbis(t-butylcyclopentadienyl) hafnium (IV).

31. The method of claim 26, wherein said metallocene catalyst comprises a co-catalyst system.

32. The method of claim 31, wherein said co-catalyst is selected from the group consisting of tri-(n-butyl) ammonium tetra bis(pentafluorophenyl) boron, tris (pentafluorophenyl) borane, an alumoxane, methylalumoxane and mixtures thereof.

33. The method of claim 26 wherein said support is selected from the group consisting of alumina, silica and silica treated with a halogenated organic compound.

34. The method of claim 33 wherein said support comprises a plurality of particles.

35. The method of claim 33 wherein said support comprises a single unitary body.

36. The method of claim 26 wherein said hydrofluorocarbon solvent has a surface tension of about 22 dynes per centimeter or less.

37. The method of claim 26 wherein said hydrofluorocarbon contains at least about 65 weight percent fluorine.

* * * * *